United States Patent
Takahashi et al.

(10) Patent No.: US 9,342,112 B2
(45) Date of Patent: *May 17, 2016

(54) OPERATION MEMBER PROVIDED IN ELECTRONIC DEVICE, AND ELECTRONIC DEVICE

(71) Applicants: SONY CORPORATION, Tokyo (JP); Sony Computer Entertainment Inc., Tokyo (JP)

(72) Inventors: Nobuyuki Takahashi, Tokyo (JP); Kenji Sakakibara, Tokyo (JP); Hiroaki Masuda, Tochigi (JP); Yu Togasaki, Kanagawa (JP); Kiyokazu Miyazawa, Kanagawa (JP); Kazuto Nakagawa, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/320,817

(22) Filed: Jul. 1, 2014

(65) Prior Publication Data

US 2014/0340312 A1    Nov. 20, 2014

Related U.S. Application Data

(63) Continuation of application No. 13/355,815, filed on Jan. 23, 2012, now Pat. No. 8,803,803.

(30) Foreign Application Priority Data

Jan. 25, 2011    (JP) ................................ 2011-013471
Aug. 12, 2011    (JP) ................................ 2011-177058

(51) Int. Cl.
*G06F 3/033*    (2013.01)
*G06F 1/16*    (2006.01)
(Continued)

(52) U.S. Cl.
CPC ............... *G06F 1/169* (2013.01); *A63F 13/06* (2013.01); *G05G 9/047* (2013.01); *G06F 3/0338* (2013.01); *A63F 2300/1043* (2013.01); *A63F 2300/204* (2013.01)

(58) Field of Classification Search
USPC ..................... 345/156, 161, 173, 157, 163
See application file for complete search history.

(56) References Cited

U.S. PATENT DOCUMENTS

| 2,040,424 | A | 5/1936 | Benner |
| 6,394,906 | B1 | 5/2002 | Ogata |

(Continued)

FOREIGN PATENT DOCUMENTS

| CN | 1139417 C | 2/2004 |
| JP | 3120575 U | 12/1991 |

(Continued)

OTHER PUBLICATIONS

Office Action for corresponding Japanese Patent Application No. 2011177058, dated on Mar. 26, 2013.

(Continued)

*Primary Examiner* — Thuy Pardo
(74) *Attorney, Agent, or Firm* — Matthew B. Dernier, Esq

(57) ABSTRACT

An operation member and an electronic device capable of maintaining operability while enhancing cushioning properties provided in the outer surface of an operation member are provided. An operation stick has a cushion portion and a base portion on which the cushion portion is placed. The base portion is supported to be movable. The base portion has a frame portion surrounding the outer periphery of the cushion portion. The base portion and the frame portion are formed of a material having a higher rigidity than that of the material of the cushion portion.

9 Claims, 5 Drawing Sheets

(51) Int. Cl.
  *A63F 13/20* (2014.01)
  *G05G 9/047* (2006.01)
  *G06F 3/0338* (2013.01)

(56) References Cited

U.S. PATENT DOCUMENTS

| | | | |
|---|---|---|---|
| 6,710,766 | B1 | 3/2004 | Ogata |
| 2003/0071785 | A1* | 4/2003 | Arita et al. .................. 345/156 |
| 2003/0085874 | A1* | 5/2003 | Burry .................. G06F 3/0213 345/161 |
| 2003/0214482 | A1* | 11/2003 | Chen .................. G06F 3/0338 345/163 |
| 2006/0061549 | A1* | 3/2006 | Chen .................. G06F 3/0338 345/157 |
| 2006/0065511 | A1 | 3/2006 | Yamazaki |
| 2006/0250377 | A1 | 11/2006 | Zadesky |
| 2007/0202956 | A1 | 8/2007 | Ogasawara |
| 2009/0148219 | A1 | 6/2009 | Odell |
| 2009/0295724 | A1* | 12/2009 | Cheng .................. G05G 9/047 345/161 |
| 2010/0073291 | A1* | 3/2010 | Hisatsugu .................. G06F 3/0338 345/161 |
| 2010/0124634 | A1 | 5/2010 | Slotta |
| 2011/0057876 | A1* | 3/2011 | Ando .................. G06F 3/0338 345/156 |
| 2011/0090150 | A1* | 4/2011 | Kawano ................ G06F 3/0338 345/161 |
| 2011/0304646 | A1 | 12/2011 | Kato |

FOREIGN PATENT DOCUMENTS

| | | |
|---|---|---|
| JP | 097464 A | 1/1997 |
| JP | 09082179 A | 3/1997 |
| JP | 1049292 A | 2/1998 |
| JP | 11353109 A | 12/1999 |
| JP | 2001155591 A | 6/2001 |
| JP | 2006100084 A | 4/2006 |
| WO | 2008002926 A2 | 1/2008 |

OTHER PUBLICATIONS

Office Action for corresponding Japanese Patent Application No. 2011-013471, dated on Dec. 18, 2012.
European Search Report for corresponding EP Application No. 12152334.4-1245 (Apr. 4, 2012).
Office Action for corresponding U.S. Appl. No. 13/355,815, dated Jan. 30, 2014.
Office Action for corresponding CN Application No. 201210066181.9, 11 pages, dated Dec. 21, 2015.

* cited by examiner

OPERATION MEMBER PROVIDED IN ELECTRONIC DEVICE, AND ELECTRONIC DEVICE

CROSS-REFERENCE TO RELATED APPLICATION

The present application is a continuation application of U.S. Ser. No. 13/355,815, filed Jan. 23, 2012, allowed, which claims priority to Japanese patent application JP2011-13471 filed on Jan. 25, 2011 and Japanese patent application JP2011-177058 filed on Aug. 12, 2011, the entire contents of which are hereby incorporated by reference.

BACKGROUND OF THE INVENTION

1. Field of the Invention

The present invention relates to an operation member provided in an electronic device, such as a pushbutton or an operation stick.

2. Description of the Related Art

An electronic device such as a portable game machine or a controller of a game device includes an operation member that is operated by a user with a finger, such as a pushbutton or an operation stick. In the specification of U.S. Pat. No. 6,394,906, an operation stick provided in a controller is disclosed. The operation stick has a column portion, and the upper end of the column portion is formed into a discoid shape. The entirety of the outer surface of the discoid part is covered with a cover. The cover enfolds the upper end of the column portion. The cover is formed of a softer material (elastomer in U.S. Pat. No. 6,394,906) than that of the column portion. Accordingly, an improvement in a touch feeling obtained when a user touches the operation stick is achieved.

SUMMARY OF THE INVENTION

However, when the outside diameter of the operation stick is designed small in the structure where the cover enfolds the upper end of the column portion, there is a need to reduce the thickness of the cover. Therefore, it becomes difficult to maintain the thickness of the cover, that is, cushioning properties. In addition, when a material with higher cushioning properties is used for the cover in the structure in which the cover enfolds the upper end of the column portion, it becomes difficult to clearly transmit a movement of the finger operating the operation stick to the electronic device, resulting in a reduction in operability.

An operation member according to an aspect of the invention can be operated by a user with a finger. The operation member includes: a cushion portion including, on a surface thereof, a pressed surface that is pressed by the finger of the user; and a base portion on which the cushion portion is placed and which is supported to be movable; and a frame portion formed in the base portion to surround an outer periphery of the cushion portion. The frame portion and the base portion are formed of a material having a higher rigidity than that of the cushion portion.

In addition, an electronic device according to another aspect of the invention includes the operation member.

According to the aspects of the invention, because the operation member has the frame portion surrounding the outer periphery of the cushion portion, even in the case where a material having high cushioning properties is used for the cushion portion, the movement of the finger operating the operation member can be clearly transmitted to the electronic device, thereby suppressing deterioration in operability. In addition, because the cushion portion is disposed on the base portion, even when the operation member is reduced in size, it becomes easy to maintain the thickness of the cushion portion.

DETAILED DESCRIPTION OF THE INVENTION

Figure 1:
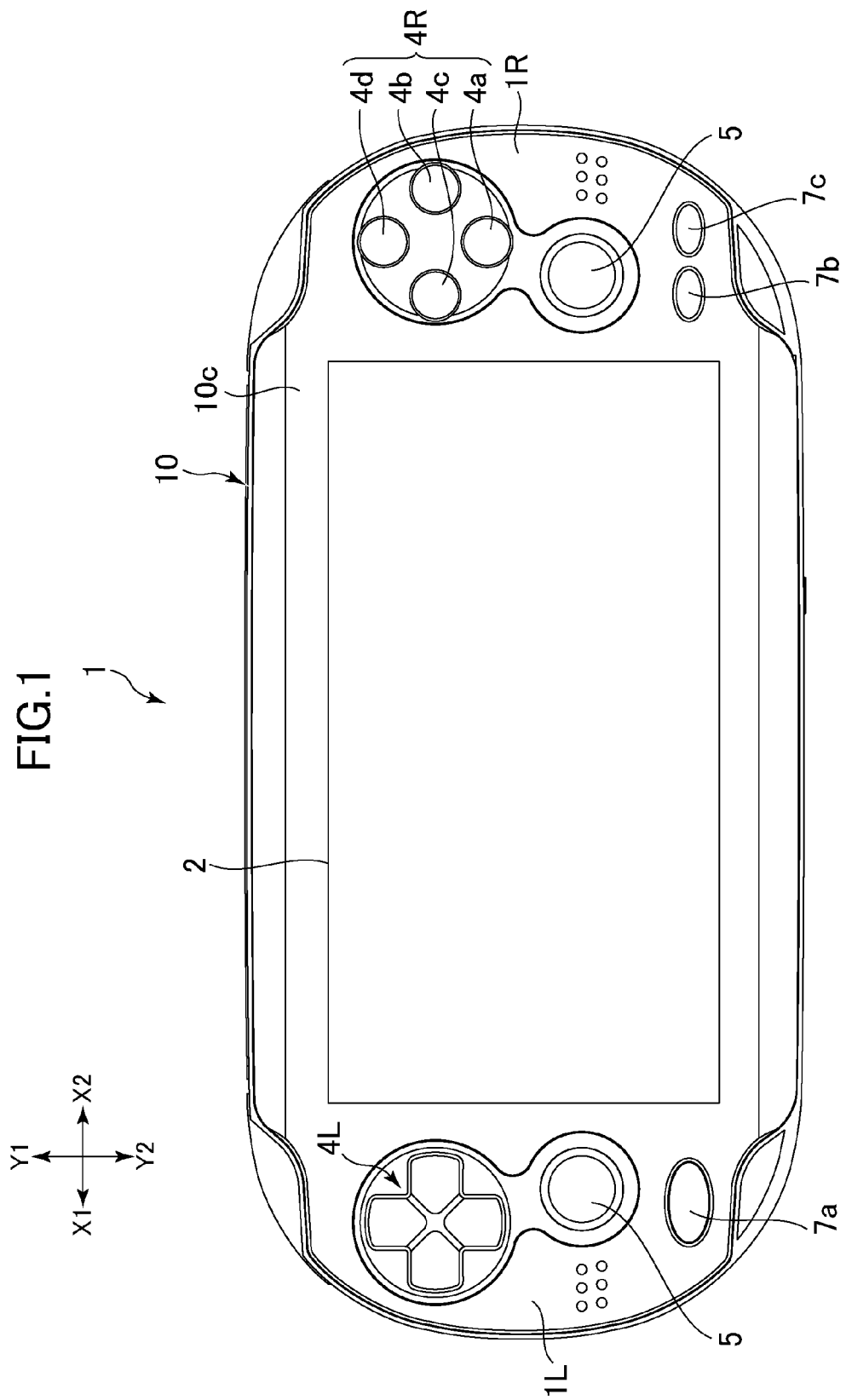
FIG. 1 is a front view of an electronic device according to an embodiment of the invention.
Figure 2:
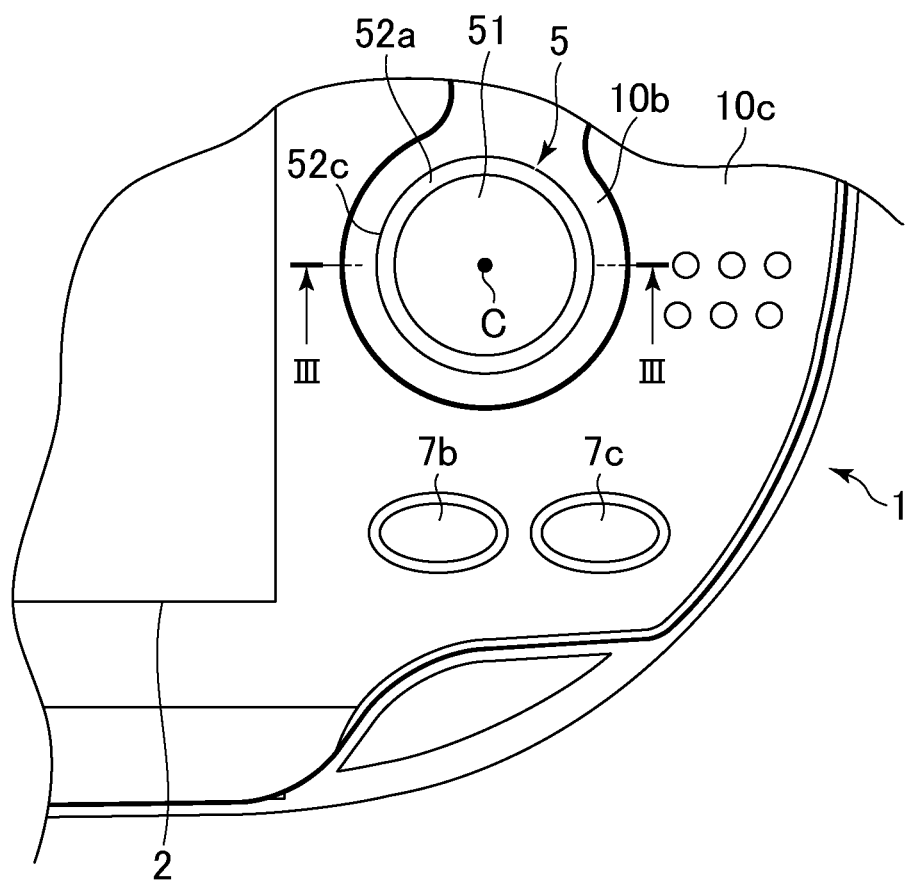
FIG. 2 is an enlarged front view of the electronic device, in which an operation stick on the right side is enlarged.
Figure 3:
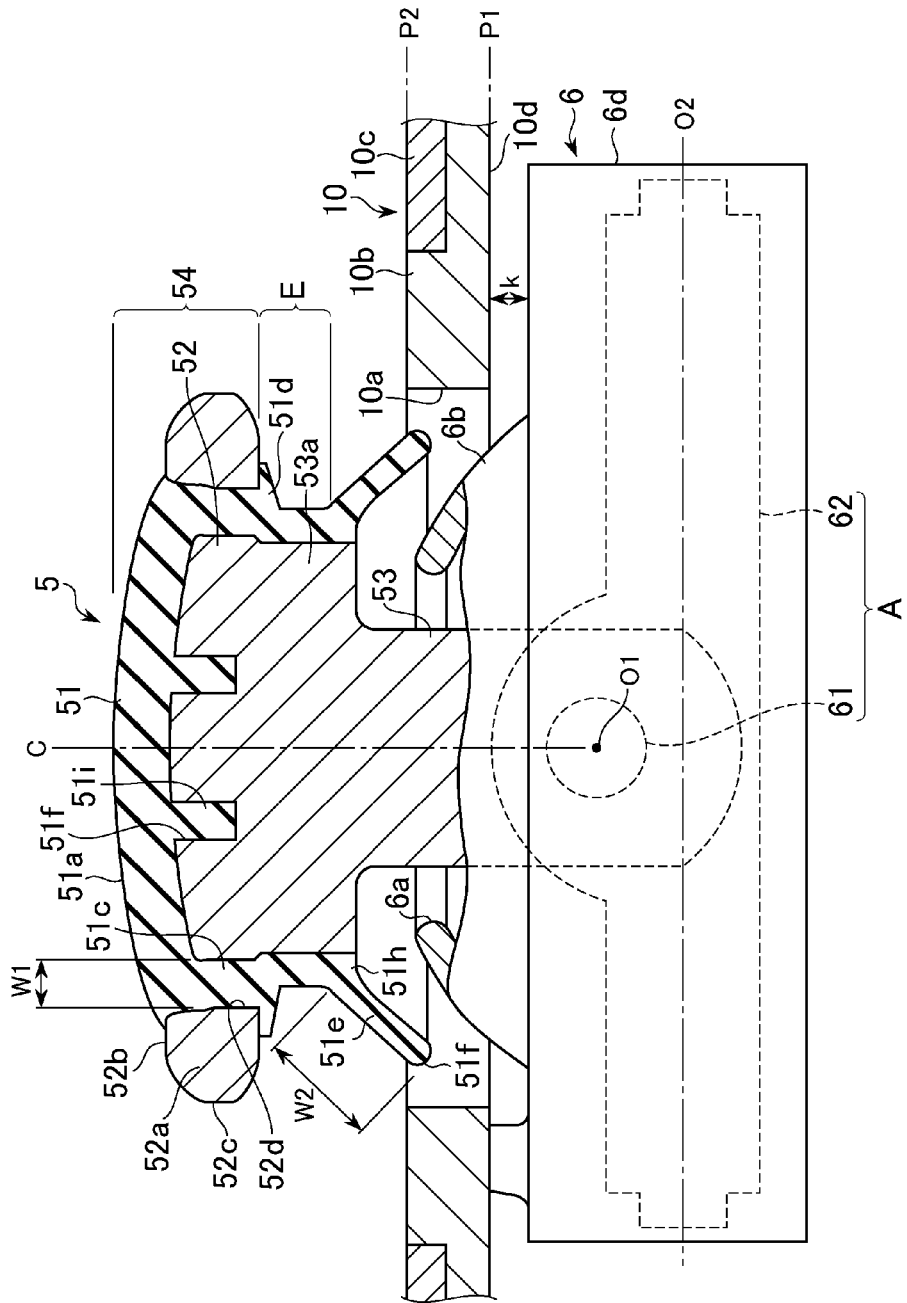
FIG. 3 is a cross-sectional view taken along the line III-III shown in FIG. 2.
Figure 4:
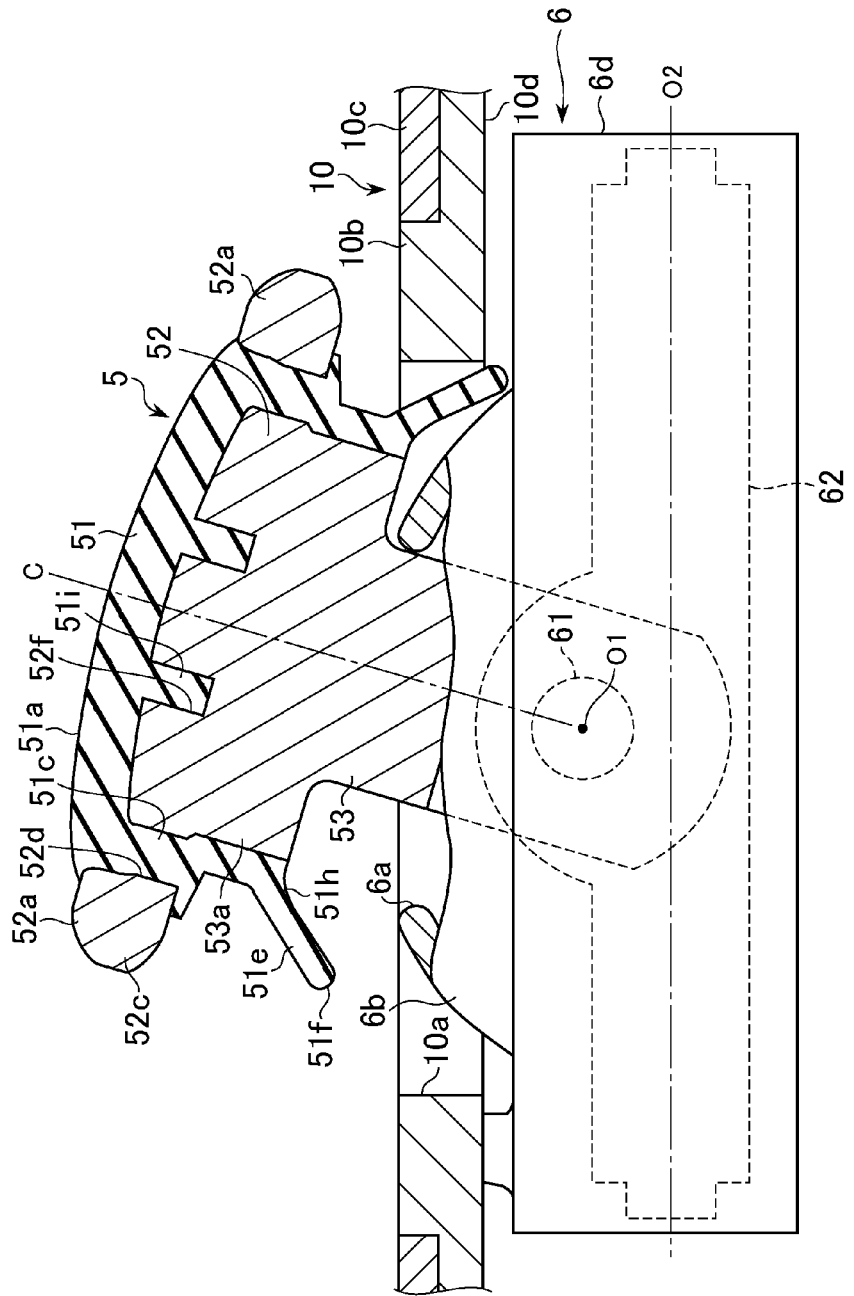
FIG. 4 is a cross-sectional view showing a state where the operation stick is tilted.

Hereinafter, an embodiment of the invention will be described with reference to the drawings. FIG. 1 is a front view of an electronic device 1 according to an embodiment of the invention. FIG. 2 is an enlarged front view of the electronic device 1, in which an operation stick 5 on the right side described later is enlarged. FIG. 3 is a cross-sectional view taken along the line III-III shown in FIG. 2. FIG. 4 is a cross-sectional view showing a state where the operation stick 5 is tilted. In the following description, the direction shown as X1-X2 of FIG. 1 is the right-left direction, and the direction shown as Y1-Y2 is the up-down direction.

The electronic device 1 is a portable electronic device such as a game machine or a personal information terminal (PDA) and has an audio reproduction function, a video reproduction function, or a wired or wireless communication function. As shown in FIG. 1, the electronic device 1 has a substantially rectangular display screen 2 on the front surface. The display screen 2 is disposed substantially at the center portion on the front surface. The electronic device 1 has holding portions 1R and 1L that can be held by a user with hands, on the right and the left of the display screen 2. As a form of use of the electronic device 1, a user holds the electronic device 1 by grasping the holding portions 1R and 1L between thumbs, middle fingers, and the like.

As shown in FIG. 1, the holding portions 1R and 1L are provided with a plurality of operation members which protrude from the front surface of the housing 10 of the electronic device 1 and can be operated by a user. Specifically, the electronic device 1 has operation sticks 5 positioned on the right and the left of the display screen 2. The operation stick 5 protrudes from the front surface of the housing 10. As shown in FIG. 3, the operation stick 5 has an operated portion 54 formed into a substantially discoid shape at the head part. The operated portion 54 is a part pressed by the finger of a user when the operation stick 5 is operated by the user. The operation stick 5 has a bar-shaped part (hereinafter, a column portion) 53 extending toward the inside of the housing 10 from the operated portion 54 (specifically, a base portion 52 described later). The diameter of the column portion 53 is smaller than that of the operated portion 54. The operation stick 5 can be moved in the radial direction about the center line C of the column portion 53. In this example, the operation stick 3 can be tilted in the radial direction (see FIG. 4).

As a form of the operation, a user presses the outer peripheral edge (an outer peripheral edge 52c (see FIG. 3) of a frame portion 52a described later) of the operated portion 54 of the operation stick 5 with a finger to tilt the operation stick 5. In addition, as another form of the operation, while a user presses the surface (a pressed surface 51a (see FIG. 3) described later) of the operation stick 5 with a finger, the user moves the finger in the radial direction (for example, in the up-down direction) to tilt the operation stick 5. The movement of the operation stick 5 is not limited to this. For example, the operation stick 5 may be enabled to slide in the radial direction without being tilted.

As shown in FIG. 3, the electronic device 1 includes a case 6. The case 6 in this example is a thin rectangular solid. The case 6 accommodates a mechanism A for supporting the base portion of the column portion 53 therein so that the operation stick 5 is moved in the radial direction of the column portion 53. The supporting mechanism A in this example includes two shafts 61 and 62 orthogonal to each other. The shafts 61 and 62 are supported to be rotatable around their axial lines O1 and O2. For example, the shaft 62 is supported by the case 6, and the shaft 61 is supported by the shaft 62. The base portion of the column portion 53 is connected to the shaft 61 to be rotatable around the shaft 61. By this structure, the column portion 53 can be tilted in all radial directions of the column portion 53 including the up-down direction, the right-left direction, and the like. In addition, the case 6 also accommodates a sensor (not shown) for detecting a degree of inclination and a direction of inclination of the column portion 53, that is, angles of rotation of the shafts 61 and 62. The angle of rotation detected by the sensor is output to a control circuit such as a CPU included in the electronic device 1. The operation stick 5 is, for example, an analog stick, and the sensor outputs a signal representing the angle of rotation.

As shown in FIG. 3, a circular opening 6a is formed in the case 6. The column portion 53 extends outward from the case 6 through the opening 6a. In this example, the column portion 53 may be tilted to touch the inner edge of the opening 6a (see FIG. 4). That is, the inner edge of the opening 6a functions as a stopper that defines the movable range of the operation stick 5.

The electronic device 1 accommodates various components such as a circuit board (not shown) and is provided with the housing 10 that forms the outer surface of the electronic device 1. As shown in FIG. 3, the case 6 is also accommodated in the housing 10. A circular opening 10a which is larger than the opening 6a is formed in the housing 10. The operation stick 5 protrudes toward the outside of the housing 10 from the opening 10a. In addition, the case 6 is larger than the opening 10a. The case 6 is fixed to the housing 10 by, for example, screws. Moreover, the housing 10 in this example includes, as shown in FIGS. 2 and 3, a housing body 10b that functions as a frame to which the circuit board or the case 6 is mounted, and a front panel 10c that is attached on the surface of the housing body 10b and forms the front surface of the electronic device 1.

As described above, the operation stick 5 includes the operated portion 54 at the tip end portion of the column portion 53. As shown in FIG. 3, the operated portion 54 includes a cushion portion 51 that forms the surface of the operated portion 54, and a base portion 52 which is formed integrally with the tip end portion of the column portion 53 and on which the cushion portion 51 is placed. The cushion portion 51 and the base portion 52 in this example are circular in a plan view and have a discoid shape on the whole.

As a form of the operation of the operation stick 5, a user tilts the operation stick 5 while pressing the surface 51a of the cushion portion 51 (hereinafter, the surface 51a is referred to as a pressed surface 51a). The cushion portion 51 is formed of a material having cushioning properties, that is, a soft material. The material of the cushion portion 51 has soft properties that allow the outer shape of the cushion portion 51 to widen out when the pressed surface 51a is pressed. In other words, in a assumed case where the cushion portion 51 not being surrounded by the frame portion 52a described later is pressed by a user, the outer shape of the cushion portion 51 may widen out. Therefore, when the user presses the pressed surface 51a of the cushion portion 51, the pressed surface 51a deforms according to the shape of the finger, so that the user can obtain a good touch feeling. The cushion portion 51 may be formed of a material having elasticity. The material of the cushion portion 51 is, for example, elastomer such as silicone or rubber. The base portion 52 has rigidity so as to suppress the outer shape of the cushion portion 51 from widening out.

The cushion portion 51 is disposed on the base portion 52 as described above. Therefore, even in a case where the outside diameter of the operated portion 54 is designed small, the cushion portion 51 can ensure a sufficient thickness.

As shown in FIG. 3, the pressed surface 51a is curved such that the center thereof is swollen up. Therefore, when a user operates the operation stick 5, the finger of the user easily touches the cushion portion 51, so that a good touch feeling is easily obtained. In addition, the bottom surface of the base portion 52 on which the cushion portion 51 is disposed is also curved such that the center thereof is swollen up in conformity with the pressed surface 51a. In addition, the cushion portion 51 has substantially the same thickness over the entire region. By this structure, a portion with excessively high cushioning properties in the pressed surface 51a can be prevented from generating.

As shown in FIG. 3, the base portion 52 has, in the outer periphery, the frame portion 52a surrounding the outer periphery of the cushion portion 51. In other words, the base portion 52 has a recessed portion formed on the inside of the frame portion 52a, and the cushion portion 51 is disposed inside the recessed portion.

The base portion 52 and the column portion 53 are formed of a material having a higher rigidity than that of the cushion portion 51. The material of the base portion 52, that is, the column portion 53 is plastic such as polycarbonate or an ABS resin (in other words, an engineering plastic). Therefore, even when a user presses the frame portion 52a, a change in the outer shape of the frame portion 52a is suppressed. As a result, when the user presses the outer peripheral edge of the operated portion 54, that is, the outer peripheral edge 52c of the frame portion 52a with a finger, the movement of the finger is clearly transmitted to the sensor in the case 6 through the operation stick 5 and the supporting mechanism A. As described above, the operation stick 5 is an analog stick, and therefore users are required to perform a delicate operation. Because the frame portion 52a is formed of the material having a higher rigidity than that of the cushion portion 51, a delicate operation by users can be clearly detected by the sensor in the electronic device 1.

The inner surface of the frame portion 52a is contact with the outer peripheral edge of the cushion portion 51. The frame portion 52a is formed along the entire periphery of the cushion portion 51 as shown in FIG. 2. In this example, the frame portion 52a is formed into an annular shape according to the outer shape of the cushion portion 51. Therefore, even in a case where a user presses any position of the outer peripheral edge of the frame portion 52a with a finger, the movement of the finger is clearly transmitted to the supporting mechanism A.

As shown in FIG. 3, the frame portion 52a has a front surface 52b that forms the surface of the operated portion 54 together with the pressed surface 51a. In this example, a slight level difference is formed between the outer peripheral edge of the pressed surface 51a and the front surface 52b, and the front surface 52b is positioned at a slightly lower position than the outer peripheral edge of the pressed surface 51a. Therefore, when a user presses the pressed surface 51a, the outer peripheral edge of the pressed surface 51a can slightly widen out. As a result, the cushioning properties of the cushion portion 51 can be increased. In this regard, the front surface 52b may also be flush with the outer peripheral edge of the pressed surface 51a. In this structure, even when the finger of a user touches both the front surface 52b and the outer peripheral edge of the pressed surface 51a, a good touch feeling can be obtained.

Figure 5:
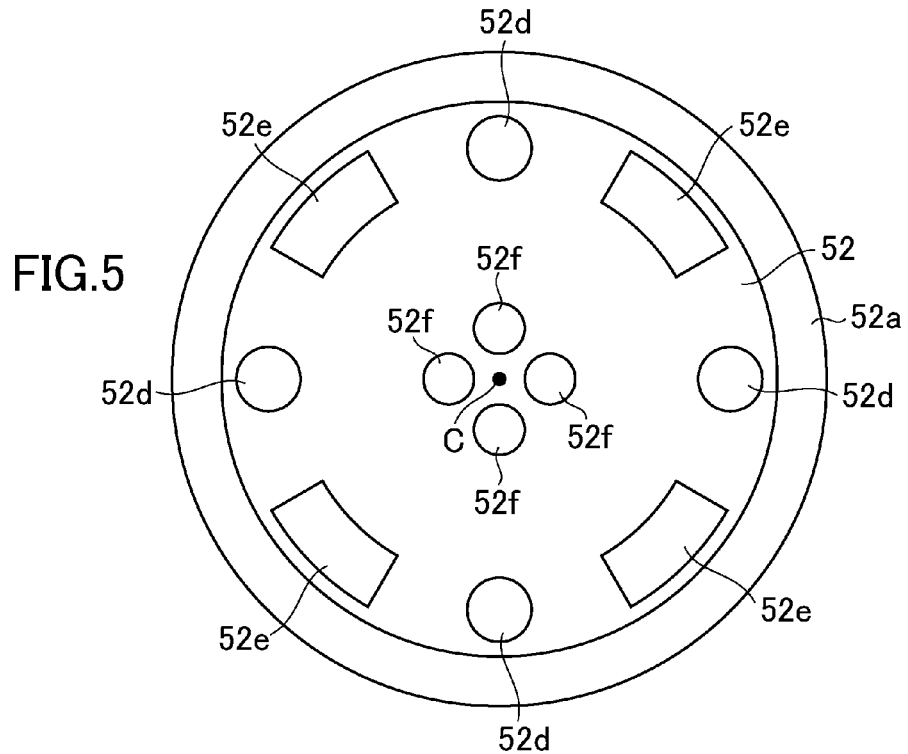
FIG. 5 is a plan view of a base portion included in the operation stick.

One of the cushion portion 51 and the base portion 52 is provided with a protrusion fitted into a hole formed in the other. Accordingly, deviation of the relative positions of the cushion portion 51 and the base portion 52 can be suppressed. FIG. 5 is a plan view of the base portion 52. As shown in FIGS. 3 and 5, through-holes 52d and 52e and a hole (recessed portion) 52f are formed in the base portion 52. The cushion portion 51 has protrusions 51c and 51i fitted into the holes 52d, 52e, and 52f. As such, the holes 52d, 52e, and 52f are formed in the base portion 52 other than in the cushion portion 51, so that the thickness of the cushion portion 51 can be ensured over the entire region thereof. As a result, no matter which part of the pressed surface 51a the finger of a user touches, a good touch feeling can be obtained.

As shown in FIG. 5, a plurality of the through-holes 52d and 52e are annularly disposed to surround the center line C of the column portion 53 at intervals. Similarly, the protrusions 51c fitted into the holes 52d and 52e are annularly disposed. Therefore, even in a case where the operation stick 5 is moved in any direction, the deviation of the relative positions of the cushion portion 51 and the base portion 52 can be suppressed. In addition, the holes 52f formed in the base portion 52 are disposed inside the through-holes 52d and 52e and are annularly disposed to surround the center line C. By this structure, the center portion of the cushion portion 51 is prevented from being misaligned from the base portion 52.

As shown in FIG. 3, the projection 51c has, at the end portion thereof, an engagement portion 51d having a larger width than a width W1 of the through-holes 52d and 52e. The engagement portion 51d is caught on the rear surface of the base portion 52. Accordingly, disengagement of the protrusion 51c from the base portion 52 is suppressed.

The protrusion 51c and the engagement portion 51d are formed at the outer peripheral portions of the cushion portion 51. More specifically, the protrusion 51c protrudes downward from the outer peripheral edge of the cushion portion 51. Therefore, the outer peripheral edge of the cushion portion 51 is suppressed from separating from the base portion 52 or the frame portion 52a. In addition, the engagement portion 51d in this example is formed into an annular shape surrounding the center line C. That is, the end portions of the protrusions 51c are connected to each other to form the annular engagement portion 51d. Therefore, even though a force is exerted on any position of the outer peripheral edge of the cushion portion 51, the cushion portion 51 is suppressed from separating from the base portion 52 or the frame portion 52a.

As shown in FIG. 3, the opening 6a of the case 6 described above has an inside diameter which is larger than the diameter of the column portion 53 so as to allow a tilt of the column portion 53. Therefore, a gap is formed around the column portion 53. The operation stick 5 has a cover portion 51e that widens in the radial direction of the column portion 53 and is positioned toward the opening 6a from the operated portion 54. The cover portion 51e covers the gap between the column portion 53 and the inner edge of the opening 6a. That is, the cover portion 51e is positioned on the outside of the opening 6a and has an outside diameter that is larger than the diameter of the opening 6a. By this structure including the cover portion 51e, the supporting mechanism A in the case 6 can be hidden from view, and infiltration of dust or the like into the case 6 can be prevented. In this regard, the cover portion 51e in this example has substantially the same outside diameter as that of the operated portion 54. The operation stick 5 has, between the cover portion 51e and the operated portion 54, a portion E with a smaller diameter than them.

The outside diameter of the cover portion 51e is larger than the inside diameter of the opening 6a of the case 6. That is, the outer peripheral edge 51f of the cover portion 51e is positioned further outwardly in the radial direction than the edge of the opening 6a. In this example, as shown in FIG. 4, even when the operation stick 5 is tilted to the limit, that is, even when the column portion 53 comes into contact with the edge of the opening 6a, the cover portion 51e covers the opening 6a. That is, when the operation stick 5 is tilted to one side (for example, the right), a part of the cover portion 51e on the opposite side (for example, the left) overlaps the edge of the opening 6a. In conclusion, the outside diameter of the cover portion 51e is designed so that, even when the operation stick 5 is tilted to the limit, the outer peripheral edge 51f of the cover portion 51e is positioned further outwardly in the radial direction than the edge of the opening 6a. As shown in FIG. 3, the outside diameter of the cover portion 51e is smaller than the inside diameter of the opening 10a of the housing 10. In other words, the outer peripheral edge 51f of the cover portion 51e is positioned further inwardly than the edge of the opening 10a. By the cover portion 51e having such a size, interference between the outer peripheral edge 51f of the cover portion 51e and the housing 10 is easily prevented. In this example, even when the operation stick 5 is tilted to the limit, the outer peripheral edge 51f of the cover portion 51e is positioned further inwardly than the edge of the opening 10a (see FIG. 4).

As shown in FIG. 3, the cross-section of the cover portion 51e has an arc shape which becomes close to the case 6 as it goes to the outer periphery of the cover portion 51e (the cross-section here uses, as its cutting surface, a surface passing through the center line C of the column portion 53). That is, the cover portion 51e has an umbrella shape, and extends downward toward the outer periphery. By the shape of the cover portion 51e, a gap between the edge of the opening 6a and the cover portion 51e that occurs when the operation stick 5 is tilted as shown in FIG. 4 can be reduced.

As shown in FIG. 3, the case 6 includes a swollen portion 6b swollen toward the inside of the cover portion 51e. The opening portion 6a is formed at the apex portion of the swollen portion 6b. By this structure, a space between a main body 6d of the case 6 and the cover portion 51e can be effectively used for increasing the capacity of the case 6. The swollen portion 6b is positioned on the inside of the opening 10a of the housing 10. Specifically, the swollen portion 6b overlaps the housing 10 in the horizontal direction. By this structure, the body 6d of the case 6 can be disposed to be close to an inner surface 10d of the housing 10 (here, the inner surface 10d is a surface facing the body 6d).

As shown in FIG. 3, the cover portion 51e is positioned toward the outside of the housing 10 than the inner surface 10d of the housing 10. That is, the cover portion 51e is distant from a plane P1 including the inner surface 10d toward the outside of the housing 10. By this structure, the outer peripheral edge 51f of the cover portion 51e can be suppressed from intruding into a gap K between the inner surface 10d of the housing 10 and the case 6. As a result, the gap K can be reduced, so that a reduction in the thickness of the electronic device 1 can be achieved. In this example, the outer peripheral edge 51f of the cover portion 51 is distant from the plane P1 toward the outside of the housing 10, and the entirety of the cover portion 51e is disposed toward the outside than the inner surface 10d. Alternatively, most of the cover portion 51e may be positioned toward the outside from the plane P1, and the outer peripheral edge 51f of the cover portion 51e may be positioned inwardly from the plane P1.

In this example, the outer peripheral edge 51f of the cover portion 51e is positioned toward the inside of the housing 10 from a plane P2 including the outer surface of the housing 10, and is positioned toward the inside of the housing 10 than the edge of the opening 6a of the case 6. By this structure, a pathway from the gap between the edge of the opening 10a of the housing 10 and the outer peripheral edge 51f of the cover portion 51e to the gap between the edge of the opening 6a of the case 6 and the column portion 53 is bent, and thus external dust or the like is much less likely to intrude into the case 6.

As shown in FIG. 4, the size of the cover portion 51e is designed so that, even when the operation stick 5 is tilted to the limit, the outer peripheral edge 51f does not come into contact with the body 6d of the case 6 or the edge of the housing 10a of the housing 10. The cover portion 51e is formed of a flexible material. For example, the cover portion 51e is formed of elastomer such as silicone or rubber. As the material of the cover portion 51e uses such a material, compared to a structure in which the cover portion 51e is formed of a hard material such as plastic, a clearance for preventing the interference between the case 6 or the edge of the opening 10a of the housing 10, and the outer peripheral edge 51f of the cover portion 51e can be reduced. As a result, it becomes easy to increase the size of the cover portion 51e.

In this example, the cushion portion 51 is formed of the same material as the cover portion 51e. Consequently, the number of processes for molding the operation stick 5 can be reduced. For example, the operation stick 5 may be molded by two-color molding (that is, double molding). That is, after the base portion 52 and the column portion 53 are formed by primary molding, they are put into a mold (a mold corresponding to the outer shape of the operation stick 5) for secondary molding. The materials of the cushion portion 51 and the cover portion 51e are poured into the mold. Accordingly, the cushion portion 51 and the cover portion 51e which are integrated with the base portion 52 and the column portion 53 are molded.

As described above, the plurality of through-holes 52d and 52e are formed in the bottom of the base portion 52. As shown in FIG. 3, the cover portion 51e and the cushion portion 51 are connected to each other through the through-holes 52d and 52e. Specifically, the engagement portion 51d is formed at the lower ends of the protrusions 51c fitted into the through-holes 52d and 52e. An inner peripheral edge (upper edge) 51h of the cover portion 51e is connected to the engagement portion 51d. The engagement portion 51d prevents both the cushion portion 51 and the cover portion 51e from being separated from the base portion 52 and the column portion 53. In particular, since the cushion portion 51 and the cover portion 51e are connected using the through-holes 52d and 52e, compared to a structure in which the entirety of the operated portion 54 is enfolded by a material forming the cushion portion 51, the material can be more effectively suppressed from being removed from the operated portion 54.

As shown in FIG. 3, the cover portion 51e widens in the radial direction from the upper portion of the column portion 53. In this example, the column portion 53 includes, in the upper portion, a large diameter portion 53a which has a larger diameter than that of the base portion or the intermediate portion (a part positioned on the inside of the inner periphery of the opening 6a) of the column portion 53. The cover portion 51e widens from the outer peripheral surface of the large diameter portion 53a in the radial direction. This structure enables the cover portion 51e having a small width W2 to cover the opening portion 6a of the case 6. As a result, even in a case where apart of the outer peripheral edge 51f of the cover portion 51e is turned up to become distant from the case 6, the supporting mechanism A in the case 6 is suppressed from being exposed. Particularly, the cover portion 51e widens from the lower edge of the large diameter portion 53a in the radial direction. Accordingly, the gap between the cover portion 51e and the swollen portion 6b can be reduced. In this regard, the engagement portion 51d described above is annular, and a part between the upper edge 51h of the cover portion 51e and the engagement portion 51d is tubular. The tubular portion surrounds the outer periphery of the large diameter portion 53a.

With reference to FIG. 1, other operation members provided in the front surface of the electronic device 1 will be described.

The holding portion 1R on the right is provided with a button group 4R. The button group 4R includes a plurality of (specifically, four) buttons 4a, 4b, 4c, and 4d. The buttons 4a, 4b, 4c, and 4d are provided at end portions of a cross. The holding portion 1L on the left is provided with a direction key 4L. The direction key 4L has a plurality of (specifically, four) convex portions formed into a cross shape on the whole. The button group 4R and the direction key 4L are respectively positioned on the upper sides of the operation sticks 5 on the left and the right. In addition, the button group 4R and the direction key 4L are positioned further outwardly in the right-left direction than the operation sticks 5. In many cases, users dispose the thumbs on the operation sticks 5 and dispose the middle fingers or the like on the rear surface (the rear surfaces of the holding portions 1R and 1L) of the electronic device 1 to hold the holding portions 1R and 1L. When the electronic device 1 is used, users obliquely move the thumbs toward the button group 4R or the direction key 4L as needed.

In the front surface of the electronic device 1, a plurality of (in this example, three) buttons 7a, 7b, and 7c are further provided. The button 7a is, for example, a home button used for returning an image displayed on the display screen 2 to an initial image. The buttons 7b and 7c are, for example, a select button used for selecting an item displayed on the display screen 2, a start button for instructing a start of execution of an application software, and the like. In this example, the surfaces of the buttons 7a, 7b, and 7c are flush with the front surface of the housing 10, that is, the front panel 10c (see FIG. 3).

Figure 6:
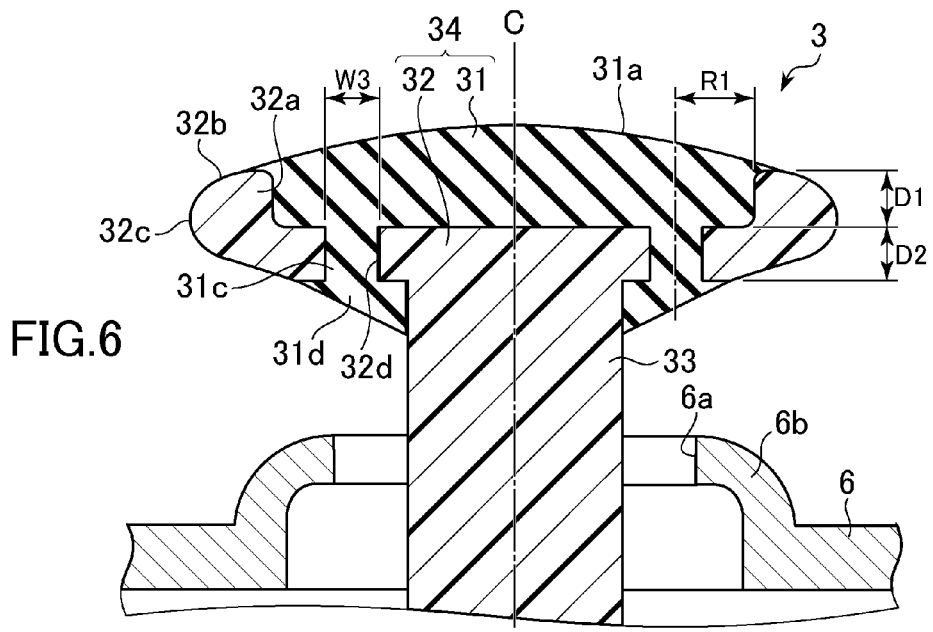
FIG. 6 is a cross-sectional view of another example of the operation stick.

The operation stick may not necessarily include the cover portion 51e. FIG. 6 is a cross-sectional view of an operation stick 3 in this example, and a cutting surface thereof is aligned with the line III-III shown in FIG. 2. The method of operating the operation stick 3 or the operation thereof is the same as that of the operation stick 5 described above.

The operation stick 3 includes an operated portion 34 at the head portion as shown in FIG. 6. The operated portion 34 includes a cushion portion 31 and a base portion 32 on which the cushion portion 31 is placed. The structures of the cushion portion 31 and the base portion 32 are substantially the same as those of the cushion portion 51 and the base portion 52 described above. Hereinafter, detailed description will be provided.

The cushion portion 31 is formed of a soft material, like the cushion portion 51. Therefore, when a user presses a pressed surface 31a of the cushion portion 31, the pressed surface 31a deforms according to the shape of the finger, so that the user can obtain a good touch feeling. In addition, as described above, the cushion portion 31 is disposed on the base portion 32. Therefore, even in a case where the outside diameter of the upper portion of the operation stick 3 including the cushion portion 31 and the base portion 32 needs to be small, the cushion portion 31 can be designed to have a sufficient thickness.

The pressed surface 31a is curved such that the center thereof is swollen up. As a result, the thickness of the cushion portion 31 is maximized at a part of the pressed surface 31a on which a force is most likely to be exerted from the finger of the user (that is, the center of the pressed surface 31a). Accordingly, the user can obtain a better touch feeling.

The cushion portion 31 has a thickness greater than that of the base portion 32. Accordingly, the thickness of the cushion portion 31 can be ensured while suppressing an increase in the thickness of the whole of the operated portion 34. In this example, the thickness of the center portion of the cushion portion 31 is greater than the thickness D2 of the base portion 32. The thickness D1 of the outermost portion of the cushion portion 31 is substantially the same as the thickness D2 of the base portion 32. Alternatively, the thickness D1 of the outermost portion of the cushion portion 31 may be greater than the thickness D2 of the base portion 32. On the contrary, the thickness D1 of the outermost portion of the cushion portion 31 may be smaller than the thickness D2 of the base portion 32.

The base portion 32 may be moved in the radial direction about the center line C of the operation stick 3 (for example, in the up-down direction or the right-left direction). The operation stick 3 in this example has a column portion 33 extending toward the inside of the electronic device 1 from the base portion 32, like the operation stick 5. The base portion of the column portion 33 is supported by a supporting mechanism A included in the case 6 described above and can be tilted in all directions about the center line C.

The base portion 32 also has a frame portion 32a, like the base portion 52. The base portion 32 is formed of a material having a higher rigidity than the material of the cushion portion 31, like the base portion 52. That is, the material of the base portion 32 is plastic such as polycarbonate or an ABS resin (in other words, an engineering plastic). Therefore, when a user presses an outer peripheral edge 32c of the frame portion 32a with the finger, the movement of the finger is clearly transmitted to a sensor of the supporting mechanism A through the operation stick 3. In this regard, the frame portion 32a is formed over the entire periphery of the cushion portion 31, like the frame portion 52a. Further, the operation stick 3 in this example is also formed by two-color molding (double molding), like the operation stick 5.

The frame portion 32a has a front surface 32b which forms the surface of the operated portion 34 together with the pressed surface 31a. The front surface 32b and the outer peripheral portion of the pressed surface 31a form the same plane. In other words, the front surface 32b is flush with the outer peripheral portion of the pressed surface 31a. By this structure, even when a user presses both the front surface 32b and the pressed surface 31a, a good touch feeling can be obtained.

The outer peripheral portion of the pressed surface 31a is inclined such that the outer edge thereof descends. The front surface 32b is inclined in conformity with the outer peripheral portion of the pressed surface 31a such that its outer peripheral edge descends, and thus is continuously connected to the pressed surface 31a. That is, a gap between the front surface 32b and the pressed surface 31a is not formed. In this regard, the relationship between the front surface 32b and the pressed surface 31a is not limited to this. A slight gap between the front surface 32b and the outer peripheral edge of the pressed surface 31a may be formed. Further, the pressed surface 31a may be formed to be horizontal. In this case, the entirety of the pressed surface 31a and the front surface 32b of the frame portion 32a may form the same plane.

In addition, like the base portion 52, a plurality of through-holes 32d are formed in the base portion 32. The cushion portion 31 has a plurality of protrusions 31c fitted into the through-holes 32d. By forming the holes 32d in the base portion 32 other than the cushion portion 31, the thickness of the cushion portion 31 can be ensured over the entire region of the cushion portion 31. In addition, the plurality of through-holes 32d and the plurality of protrusions 31c are disposed in an annular shape surrounding the center line C, like the through-holes 52d and 52e and the protrusions 51c described above.

The protrusion 31c reaches the opposite side to the cushion portion 31 of the base portion 32 through the through-hole 32d. That is, the protrusion 31c penetrates through the base portion 32 in the thickness direction. The protrusion 31c includes an engagement portion 31d at the end portion. The engagement portion 31d is positioned on the rear side of the base portion 32 and has a width greater than the width W3 of the hole formed in the base portion 32. Accordingly, the engagement portion 31d is caught on the rear surface of the base portion 32. The engagement portion 31d is annular and surrounds the column portion 33. That is, the end portions of the protrusions 31c are connected to each other to form the annular engagement portion 31d. Therefore, the cushion portion 31 is much less likely to come off the base portion 32. The inside diameter of the engagement portion 31d corresponds to the outside diameter of the column portion 33.

The protrusions 31c and the engagement portion 31d are positioned toward on the outer side of the cushion portion 31. Specifically, the distance R1 between the protrusion 31c and the outer edge of the cushion portion 31 is smaller than the distance between the protrusion 31c and the center line C. Therefore, the outer edge of the cushion portion 31 is more effectively suppressed from separating from the base portion 32.

As described above, the operation sticks 3 and 5 include the cushion portions 31 and 51 having the pressed surfaces 31a and 51a on the surfaces thereof, and the base portions 32 and 52 on which the cushion portions 31 and 51 are placed and which are supported to be movable. The base portions 32 and 52 have the frame portions 32a and 52a surrounding the outer peripheries of the cushion portions 31 and 51 and are formed of materials having higher rigidities than those of the cushion portions 31 and 51. Therefore, even when materials with high cushioning properties are used for the cushion portions 31 and 51, changes in the outer shapes of the operated portions 34 and 54 of the operation sticks 3 and 5 are suppressed. As a result, the movement of the finger operating the operation sticks 3 and 5 can be clearly transmitted to the electronic device 1, so that degradation in operability can be suppressed. In addition, since the cushion portions 31 and 51 are disposed on the base portions 32 and 52, even in the case where the sizes of the operated portions 34 and 54 of the operation sticks 3 and 5 are reduced, it becomes easy to maintain the thicknesses of the cushion portions 31 and 51.

The operation sticks 3 and 5 include the column portions 33 and 53 with a tip end on which the base portions 32 and 52 formed, and the column portions 33 and 53 are movable. Therefore, when a user presses the outer peripheral edges of the frame portions 32a and 52a with a finger to tilt or slide the operation sticks 3 and 5, the movement of the finger is clearly input to the electronic device 1 through the operation sticks 3 and 5.

The frame portions 32a and 52a are formed over the entire peripheries of the cushion portions 31 and 51. Consequently, when the operation sticks 3 and 5 are moved in any radial direction, the movement of the finger can be clearly input to the electronic device.

The thickness of the cushion portion 31 is greater than the thickness of the base portion 32. Accordingly, the thickness of the cushion portion 31 can be easily ensured.

The cushion portions 31 and 51 are provided with the protrusions 31c, 51c, and 51i protruding toward the base portions 32 and 52, and the base portions 32 and 52 have the holes 32d, 52f, and 52d formed thereon into which the protrusions 31c, 51c, and 51i are fitted. By this structure, the deviation of the relative positions of the cushion portions and the base portions can be suppressed. In addition, it becomes easy to ensure a sufficient thickness of the cushion portions 31 and 51 over entire area. Alternatively, the base portions 32 and 52 may be provided with protrusions protruding toward the cushion portions 31 and 51, and the cushion portions 31 and 51 may have holes into which the protrusions of the base portions 32 and 52 are fitted.

Further, the protrusions 31c, 51c, and 51i are arranged in an annular shape surrounding the center line of the column portions 32 and 52. Accordingly, the deviation of the relative positions of the cushion portions 31 and 51 and the base portions 32 and 52 can be effectively suppressed.

In addition, the holes 32d and 52d of the base portions 32 and 52 penetrate through the base portions 32 and 52, and the protrusions 31c and 51c of the cushion portions 31 and 51 reach the opposite sides of the base portions 32 and 52 through the holes 32d and 52d, and have, at the end portions, the engagement portions 31d and 51d caught on the base portions 32 and 52. Accordingly, the cushion portions 31 and 51 can be suppressed from separating from the base portions 32 and 52.

In addition, the cushion portions 31 and 51 are provided with the plurality of protrusions 31c and 51c and they are arranged in an annular shape surrounding the column portions 33 and 53. In addition, the engagement portions 31d and 51d formed at the end portions thereof are formed into annular shapes. Accordingly, even in a case where the operation sticks are moved in any direction, the cushion portions 31 and 51 are effectively suppressed from coming off the base portions 32 and 52.

The frame portion 32a includes an outer surface which forms the same plane together with the outer peripheral portion of the surface of the cushion portion 31. By this structure, even when a user presses the frame portion 32a and the cushion portion 31, a good touch feeling can be obtained.

The materials of the cushion portions 31 and 51 have soft properties such that the outer shapes thereof widen out when the surfaces of the cushion portions 31 and 51 is pressed. When the cushion portions 31 and 51 have such a degree of soft properties, a better touch feeling can be obtained when a user operates the operation sticks 3 and 5.

The operation stick 5 includes the cover portion 51e. Accordingly, the mechanism in the case 6 can be hidden from view, and infiltration of dust or the like into the case 6 can be prevented by the cover portion 51e.

The cover portion 51e is positioned toward the outside of the housing 10 than the inner surface 10d of the housing 10. By such arrangement of the cover portion 51e, it becomes easy to suppress the outer peripheral portion of the cover portion 51e from intruding between the inner surface 10d of the housing 10 and the case 6. As a result, the case 6 can be disposed closer to the inner surface 10d of the housing 10. Therefore, a reduction in the thickness and a reduction in the size of the electronic device 1 can be achieved.

The outer peripheral edge 51f of the cover portion 51e is positioned further outwardly in the radial direction than the edge of the opening 6a of the case 6, and is positioned further inwardly in the radial direction than the edge of the opening 10a of the housing 10. By the cover portion 51e with such a size, while entering of dust or the like through the gap between the edge of the opening 6a and the column portion 53 is suppressed, the interference between the housing 10 and the cover portion 51e can be easily prevented when the operation stick 5 is tilted.

In addition, the cover 51e is connected to the cushion portion 51. By this structure, it becomes easy to mount the cover portion 51e to the base portion 52 and the column portion 53.

The cover portion 51e is connected through the through-hole 52d formed in the base portion 52. Accordingly, the cover portion 51e can be firmly fixed to the column portion 53 and the base portion 52.

In addition, the cover portion 51e is formed of a flexible material. Accordingly, compared to a structure in which the cover portion 51e is formed of a hard material such as plastic, the clearance for preventing the interference between the case 6 or the edge of the opening 10a of the housing 10, and the outer peripheral edge 51f of the cover portion 51e can be reduced. As a result, it becomes easy to increase the size of the cover portion 51e, so that the function of the cover portion 51e can be enhanced.

The material of the cover portion 51e is the same as the material of the cushion portion 51. Therefore, the number of processes for molding the operation stick 5 can be reduced.

In addition, the case 6 has the opening 6a formed thereon and the swollen portion 6b swollen toward the inside of the cover portion 51e. By this structure, the capacity of the case 6 can be increased effectively using the space between the cover portion 51e and the body 6d of the case 6.

Note that, the invention is not limited to the electronic device 1 described above, and various modifications can be made.

For example, the large diameter portion 53a may not necessarily be provided in the column portion 53. In this case, the cover portion 51e may widen in the radial direction from a part having the same thickness as that of the base portion of the column portion 53.

The case 6 may not necessarily be provided with the swollen portion 6b. In this case, the main body 6d of the case 6 may have the opening 6a.

The cover portion 51e and the cushion portion 51 may not necessarily be connected to each other. In this case, the cover portion 51e and the cushion portion 51 may be respectively fixed to the column portion 53 and the base portion 52. For example, the cushion portion 51 may be adhered to the base portion 52, and the cover portion 51e may be adhered to the column portion 53. In this case, the protrusion 51c and the engagement portion 51d may not be provided in the cushion portion 51. In addition, the cushion portion 31 may be adhered to the base portion 32. In this case, the protrusion 31c and the engagement portion 31d may not be provided in the cushion portion 31.

The structure in which the cushion portions 31 and 51 and the base portions 32 and 52 are included may also be applied to buttons as well as the operation sticks. That is, the buttons 4a, 4b, 4c, and 4d constituting the button group 4R and the direction key 4L may include the cushion portions 31 and 51 and the base portions 32 and 52 described above. In this case, it becomes easy to determine the clearance between the outer periphery of the buttons 4a, 4b, 4c, and 4d and the inner edge of a hole in which the buttons 4a, 4b, 4c, and 4d are fitted. In addition, it becomes easy to determine the clearance between the outer periphery of the direction key 4L and the inner edge of a hole in which the direction key 4L is fitted. Moreover, since the frame portions 32a and 52a are disposed in the outer peripheries of the cushion portions 31 and 51, the finger of the user may touch the frame portions 32a and 52a as well as the cushion portions 31 and 51. As a result, pressing of the direction key 4L and the buttons 4a, 4b, 4c, and 4d can be clearly transmitted to the electronic device.

In addition, a film made of a different material from the cushion portion 31 may be adhered to the surface of the cushion portion 31. Accordingly, smoothness of the surface of the cushion portion 31 can be enhanced or a non-slip function of the surface of the cushion portion 31 can be enhanced.

What is claimed is:

1. An electronic device comprising:
    an operation stick including
        a column portion, and
        an operated portion provided at a tip end of the column portion and including a base portion and a cushion portion, the operation stick being movable in a radial direction of the column portion and serving as an operation member;
    a case incorporating a mechanism adapted to support a base of the column portion, the case having an opening formed therein, the opening through which the column portion passes; and
    a cover portion provided on the operation stick and located closer to the case than the operated portion, the cover portion spreading in the radial direction of the column portion to cover a gap between an outer peripheral surface of the column portion and an edge of the opening of the case.

2. The electronic device of claim 1, further comprising
    a housing adapted to accommodate the case and having an opening formed therein, the opening being larger than the opening of the case, the operation stick projecting from the opening of the housing,
    wherein the cover portion is located closer to an outside of the housing than to an inner surface of the housing.

3. The electronic device of claim 2,
    wherein an outer peripheral edge of the cover portion is located more outward in the radial direction than the edge of the opening of the case and more inward in the radial direction than an edge of the opening of the housing.

4. The electronic device of claim 1,
    wherein a front face of the operated portion is made of a different material from that of the column portion, and
    the cover portion is formed to be integral with the front face of the operated portion.

5. The electronic device of claim 1,
    wherein the cover portion is made of a flexible material.

6. The electronic device of claim 1,
    wherein the operated portion includes the cushion portion made of a cushioning material, the cushion portion covering the front face of the operated portion, and
    the cover portion and the cushion portion are made of the same material.

7. The electronic device of claim 6,
    wherein the cover portion is connected with the cushion portion.

8. The electronic device of claim 7,
    wherein the operated portion includes the base portion adapted to support the cushion portion, and
    the cover portion is connected with the cushion portion via a through-hole formed in the base portion.

9. The electronic device of claim 1,
    wherein the cover portion is in a shape having, toward its outer circumference, an arc-shaped cross section that approaches the case, and
    the case has an area in which the opening is formed and that swells toward an inside of the cover portion.

* * * * *